UNITED STATES PATENT OFFICE.

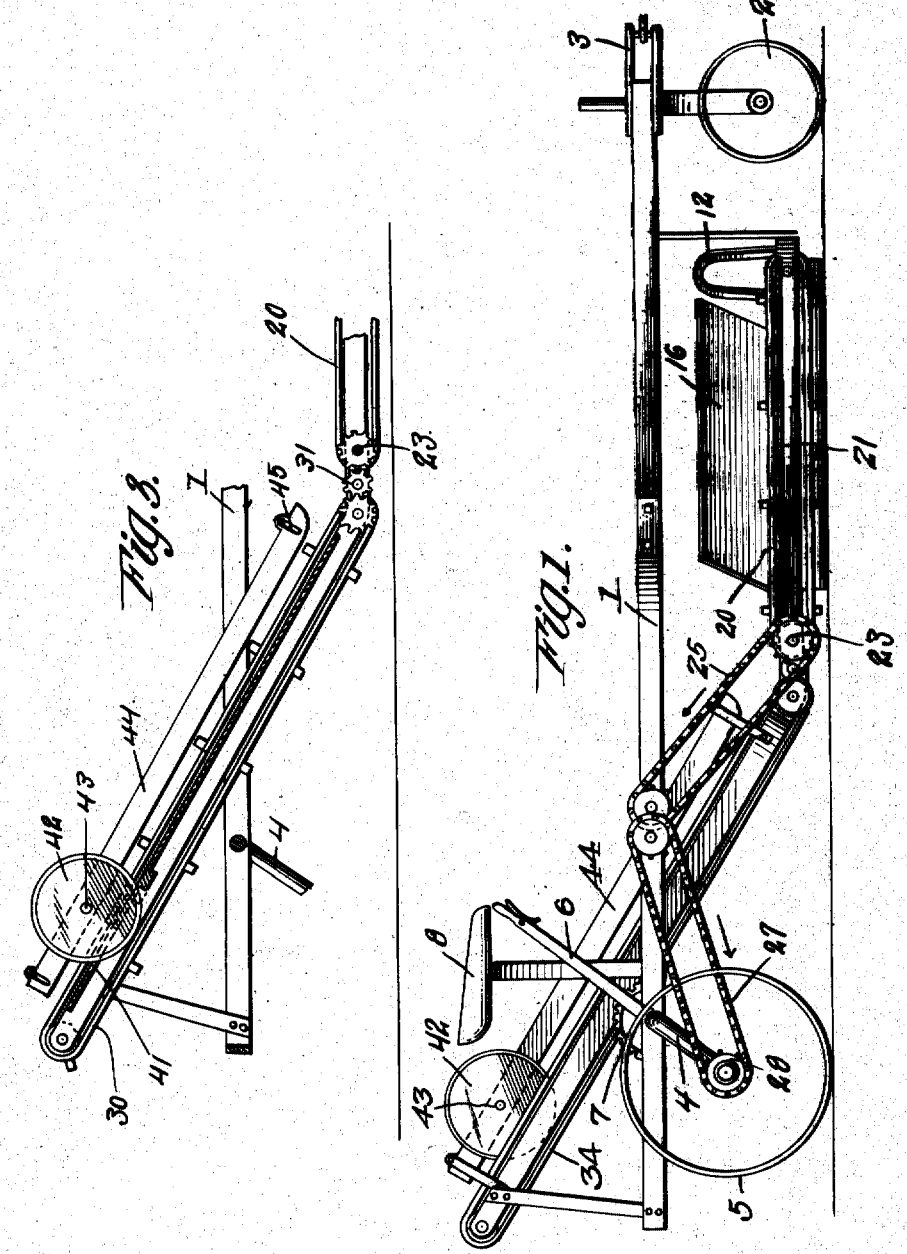

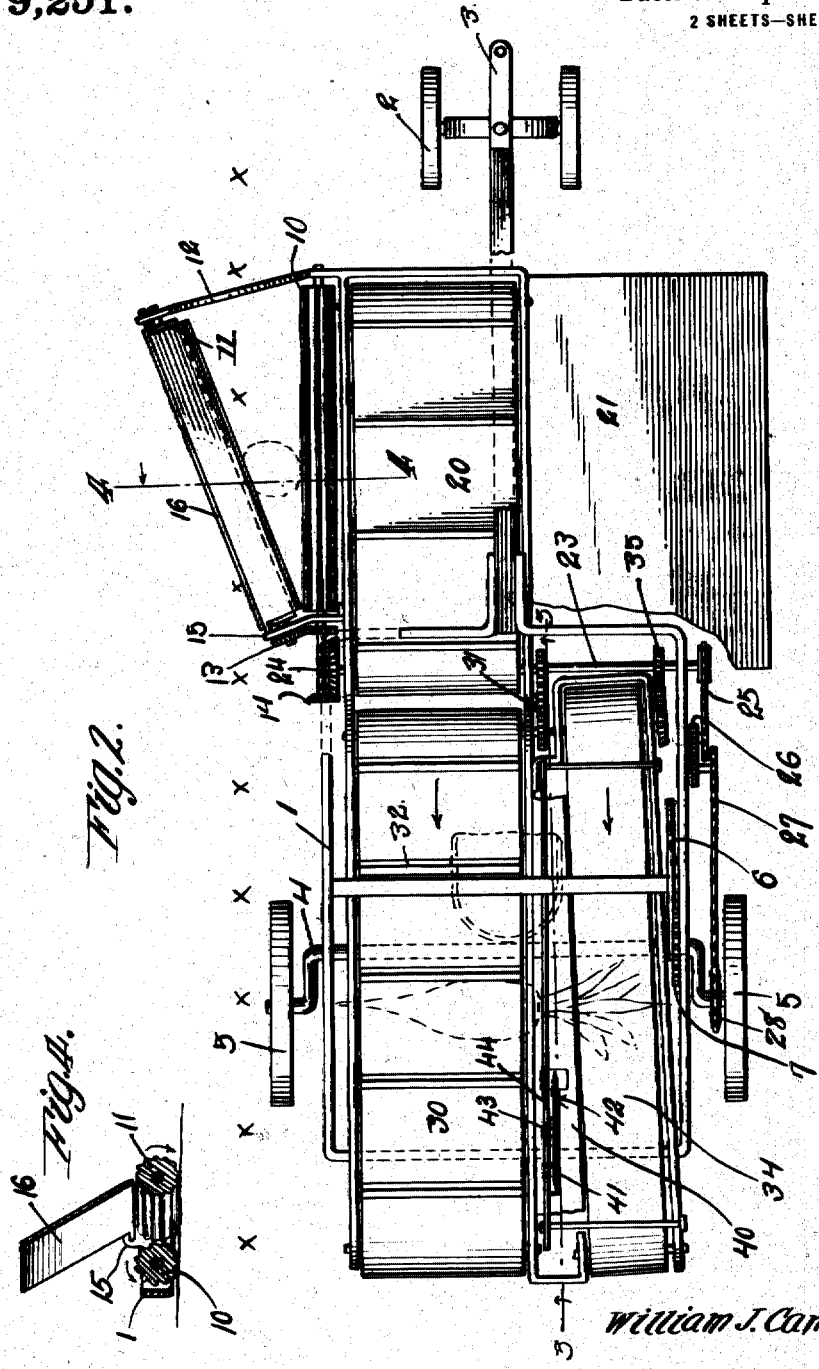

WILLIAM J. CAMPBELL, OF HOOPESTON, ILLINOIS.

BEET PULLER AND TOPPER.

1,279,251.  Specification of Letters Patent.  Patented Sept. 17, 1918.

Application filed March 27, 1918. Serial No. 225,018.

*To all whom it may concern:*

Be it known that I, WILLIAM J. CAMPBELL, a citizen of the United States, residing at Hoopeston, in the county of Vermilion and State of Illinois, have invented certain new and useful Improvements in Beet Pullers and Toppers, of which the following is a specification.

This invention relates to harvesters, and more particularly it is a machine intended to pull beets from the ground, cut off their tops, and deliver their bodies and their tops separately.

The object of the invention is to simplify a machine of this type and to produce a structure in which proper disposition is made of the parts mentioned and also of the leaves and dirt.

Other objects will appear from the following specification, and reference is made to the drawings, wherein:—

Figure 1 is a side elevation of this machine complete,

Fig. 2 is a plan view thereof,

Fig. 3 is a longitudinal sectional detail on the line 3—3 of Fig. 2, and

Fig. 4 is a small sectional detail on the line 4—4 of Fig. 2.

The main frame 1 is supported by front wheels 2 and has at its front end a clevis 3 or other device by which the draft is attached. Near its rear end the frame is mounted on a cranked axle 4 carrying the main wheels 5, and the position of this axle may be set by means of a hand lever 6 moving over a toothed sector 7 alongside the driver's seat 8 as usual.

The gathering devices, which in the present instance are means for pulling the beets out of the ground, are carried at the left forward end of this framework. This mechanism includes two fluted rollers 10 and 11, the former standing alongside the frame and parallel therewith and the latter standing oblique to the roller 10 so that the rear ends of these rollers merely touch each other whereas their front ends are separated to a considerable extent, their trunnions at this point being mounted in an arch 12 carried by the framework as best seen in Fig. 1. Their rear trunnions carry intermeshing gears 13, one of which is on a shaft carrying a bevel gear 14 which receives its power in a manner presently to be described, the result being that they are rotated constantly in the direction of the arrows in Fig. 4.

The bracket 15 which carries the bearings for the rear trunnions, and the arch 12, are connected by a deflector plate 16 which inclines upward and inward over the outer roller 11, and whose function is to direct the beet tops and eventually the beet bodies inward over the inner roller for a purpose yet to appear. The arch 12 is of sufficient height to pass over the tops of growing beets, and the machine is driven along a row of these tops indicated by the cross marks in Fig. 2.

The beets fall onto an apron or endless conveyer 20 whose upper side moves to the rear as shown, and some of the leaves and much of the dirt may fall over onto a metal platform 21 carried by the framework to the right side of the conveyer as seen in Fig. 2. The conveyer passes around rollers whereof the rearmost is fixed on a shaft 23 journaled across the main frame, and the left end of this shaft carries a bevel gear 24 meshing with the bevel gear 14 above described. The right end of said shaft is connected by sprocket wheel and chain 25 with a pair of intermeshing gear 26, and one of the latter carries a sprocket wheel connected by a chain 27 with a driving sprocket 28 on the hub of one of the main wheels 5. By this simple means power is communicated from this wheel as the arrows in Fig. 1 indicate, and the rotation of the main shaft 23 drives the gathering mechanism above described, the apron or conveyer 20 already referred to, and other elements yet to be described.

In rear of the apron 20 is another endless conveyer or apron 30 which inclines upward and rearward and therefore may be called an elevator, and the apron or carrier 20 delivers to the apron or elevator 30. The latter moves around rollers, one of which stands adjacent the rear roller of the apron 20 and has its trunnion connected by gearing 31 with the main shaft 23 so that the upper stretch of the elevator moves to the rear as shown by the arrow in Fig. 2. The slats 32 on this elevator cause the beet bodies to lie thereon in the position indicated in dotted lines in this view. Just to the right of the elevator is another endless apron or belt 34 mounted on rollers which are journaled in the framework in such manner that the belt diverges slightly from front to rear as it moves upward alongside the elevator. The trunnion of the forward roller is connected by gearing 35 to the main shaft 23 so that the direction of movement of the upper stretch of this belt is as indicated by the arrow in Fig. 2. It is on this belt that the tops of the beets lie as they move upward and rearward, their bodies resting meanwhile on the elevator and against its slats as has just been stated, and obviously the rear end of the belt should be about on a level with the rear end of the elevator, or if anything a little below the level thereof. A receptacle may be carried on or hung beneath the framework of this machine under the rear end of the elevator and onto it the beets will drop, but the tops may be allowed to fall off the rear end of the belt onto the ground where they become fertilizer when they are worked in and permitted to decay.

The space between the elevator and belt is bridged over by a narrow sheet of metal as indicated at 40, and disposed in a longitudinal slot 41 therein is a disk or cutter 42 whose edge may be plain as shown or of other configuration. The disk preferably has its support at 43 in a side bar 44 which is slotted as at 45 so that it may be adjusted entire in its reference to the main frame, and the disk will be adjusted with it.

Now when the machine is driven along a row of plants as indicated by the cross mark in Fig. 2, the gathering mechanism draws the beet bodies from the ground, and the deflector plate 16 throws them forcibly over onto the conveyer 20 and their tops fall onto the platform 21 which knocks off some of the leaves and much of the dirt. Meanwhile the conveyer is moving to the rear, and the beets travel over the gearing, the bodies moving up the elevator and the tops moving up the belt. When the cutting knife or disk 42 is encountered, the top is severed from the body and both proceed on their divergent way, the beet probably falling into a receptacle on the main frame or possibly falling into a receptacle carried by another vehicle which is driven behind or trails behind the machine described. The tops fall onto the ground and may become fertilizer in the manner above suggested. The dirt and leaves upon the platform fall off, and the platform may be a trifle inclined so as to assist. Especial attention is called to the deflector plate 16 and the function constantly performed by it. By means of its use, a pair of forwardly divergent rollers (especially if their bodies are fluted as shown) may be made to gather beets of any size or sizes, the smaller ones passing farther to the rear and the larger ones contacting with the rollers at points farther forward as will be clearly understood. The rotation of these rollers draws the beet bodies out of the ground by grasping the beet tops, then the neck, and finally the upper portions of the bodies themselves; and if necessary the fluting or ridges on the rollers may be made soft so as not to crush the beet bodies as they are forced out of the earth. The deflector plate turns the tops and then the bodies over onto the conveyer 20 and platform 21 in substantially the position necessary to knock off the dirt and leaves and permit the subsequent handling of the vegetable in a manner already described. This machine is extremely simple, and therefore it is inexpensive and within the reach of many beet growing farmers. It can be drawn by horse power or tractor power, and a great many small changes can be made without departing from the principle of my invention.

What I claim as new is:—

1. In a beet harvester, the combination with gathering mechanism; of endless belts diverging slightly from each other at their rear ends, their front ends standing adjacent said mechanism whereby the beets and their tops are delivered onto said belts, and cutting mechanism between the rear portions of the belts for severing the tops from the beets.

2. In a beet harvester, the combination with a gathering mechanism, and means for turning the gathered beets to a position transverse to the length of the machine; of rearwardly and upwardly divergent endless elements constituting an elevator and a belt for the tops, a bridge between the inner edges of said belts, said bridge having a slot, and a cutter disposed within said slot.

3. In a beet harvester, the combination with a gathering mechanism, and means for turning the gathered beets to a position transverse to the length of the machine; of an upwardly and rearwardly moving endless elevator having slats across it against which the beet bodies lie, an upwardly and rearwardly moving belt adjacent one side of the elevator and upon which the tops of the beets lie, a rotary cutting disk disposed between the elevator and belt near their delivery ends, a pivotal support for said disk, and means for adjusting the support vertically.

4. In a beet harvester, the combination with an apron, a platform alongside the same, and delivering and topping mechanisms to which the apron delivers; of gathering mechanism along that side of the apron opposite said platform, the same comprising forwardly divergent rollers, means for rotating them upwardly and outwardly from their inner sides, and a deflector plate overlying the outer roller and inclined inwardly toward the inner roller.

5. In a beet puller, the combination with a framework mounted on wheels, and means for moving it forward; of a roller journaled in bearings along one side of said frame, a bracket at the rear end of this roller and an arch at its front end, a second roller journaled in the bracket and arch and diverging forward from said first roller, a deflector plate carried by the bracket and arch and
5 standing over the last named roller and inclined inward, and means for rotating the rollers oppositely.

In testimony whereof I affix my signature in presence of two witnesses.

WILLIAM J. CAMPBELL.

Witnesses:
J. E. MERRITT,
ALMA YATES.